(12) United States Patent
Fuleshwar Prasad et al.

(10) Patent No.: US 12,481,797 B2
(45) Date of Patent: Nov. 25, 2025

(54) INTERNET-OF-THINGS DEVICES AND METHODS OF CONTROLLING POWER THERETO

(71) Applicant: BlackBerry Limited, Waterloo (CA)

(72) Inventors: Mahendra Fuleshwar Prasad, Waterloo (CA); Scott Leonard Dill, Paris (CA); Cortez Corley, Waterloo (CA); Jonathan Quinn Brubacher, Waterloo (CA); Ying Tong Man, Waterloo (CA)

(73) Assignee: BlackBerry Limited, Waterloo (CA)

( * ) Notice: Subject to any disclaimer, the term of this patent is extended or adjusted under 35 U.S.C. 154(b) by 221 days.

(21) Appl. No.: 18/148,004

(22) Filed: Dec. 29, 2022

(65) Prior Publication Data

US 2024/0220668 A1    Jul. 4, 2024

(51) Int. Cl.
| | |
|---|---|
| *G06F 21/81* | (2013.01) |
| *G06F 1/26* | (2006.01) |
| *G06F 1/28* | (2006.01) |
| *G06F 21/88* | (2013.01) |

(52) U.S. Cl.
CPC ............... *G06F 21/81* (2013.01); *G06F 1/26* (2013.01); *G06F 1/28* (2013.01); *G06F 21/88* (2013.01)

(58) Field of Classification Search
CPC ...................................................... G06F 21/81
See application file for complete search history.

(56) References Cited

U.S. PATENT DOCUMENTS

| | | | | |
|---|---|---|---|---|
| 6,072,393 | A | * | 6/2000 | Todd .................. G08B 13/1409 340/568.1 |
| 2006/0192653 | A1 | * | 8/2006 | Atkinson ................ G06F 21/88 235/492 |
| 2012/0032834 | A1 | * | 2/2012 | Weeks .................... G01S 7/003 726/36 |
| 2013/0099696 | A1 | | 4/2013 | Maxik et al. |
| 2016/0172136 | A1 | * | 6/2016 | McGaffey .............. G08G 1/005 335/179 |
| 2017/0064433 | A1 | | 3/2017 | Hirsch et al. |
| 2017/0223807 | A1 | | 8/2017 | Recker et al. |

(Continued)

OTHER PUBLICATIONS

EPO: Extended European Search Report relating to EP application No. 23215036.7, dated May 16, 2024.

*Primary Examiner* — William R Korzuch
*Assistant Examiner* — Aditya Sriram
(74) *Attorney, Agent, or Firm* — Conley Rose, P.C.; J. Robert Brown, Jr.

(57) ABSTRACT

An Internet of Things device and method for controlling the flow of power to a device through remote instructions. The device may include a battery and a switch coupling the battery to a main circuit, the switch including a sensor detecting a first condition. While detecting the first condition, the switch may be open-circuited, decoupling the battery from the main circuit. While not detecting the first condition, the switch is close-circuited, coupling the battery to the main circuit and providing power. The device may further include a controller coupled to a wireless communications module, which may receive instructions from a remote server. These instructions may instruct the controller to send a disable signal to the switch, preventing the switch from becoming open-circuited when the sensor detects the first condition.

16 Claims, 6 Drawing Sheets

(56) References Cited

U.S. PATENT DOCUMENTS

| | | |
|---|---|---|
| 2018/0276427 A1 | 9/2018 | Depew et al. |
| 2019/0026506 A1 | 1/2019 | Depew et al. |
| 2020/0311317 A1* | 10/2020 | Tucker ............... G08B 13/1436 |
| 2023/0055278 A1* | 2/2023 | Su ........................... H02J 1/084 |

* cited by examiner

INTERNET-OF-THINGS DEVICES AND METHODS OF CONTROLLING POWER THERETO

FIELD

The present disclosure relates to an Internet of Things (IoT) device, such as an asset tracking device, and methods and systems of powering such a device.

BACKGROUND

IoT devices are typically powered by batteries and are often designed to use a magnet and magnetic sensor to control power to the device from the batteries. These devices are typically kept in a powered off state by keeping a magnet close to the sensor within the device, and put in a powered on state by moving the magnet away from the sensor when first installing and/or enabling the device.

In some applications, end users may intentionally or maliciously power-down a device using a magnet. For example, in a case such as asset tracking drivers may prefer not to be tracked, and may use magnets to power off asset-tracking devices. In other use cases, nearby sources of magnetism could inadvertently shutdown the device or place it at risk of temporary or permanent shutdown.

BRIEF DESCRIPTION OF THE DRAWINGS

Reference will now be made, by way of example only, to the accompanying drawings which show example embodiments of the present application, in which.

DETAILED DESCRIPTION

Figure 1:
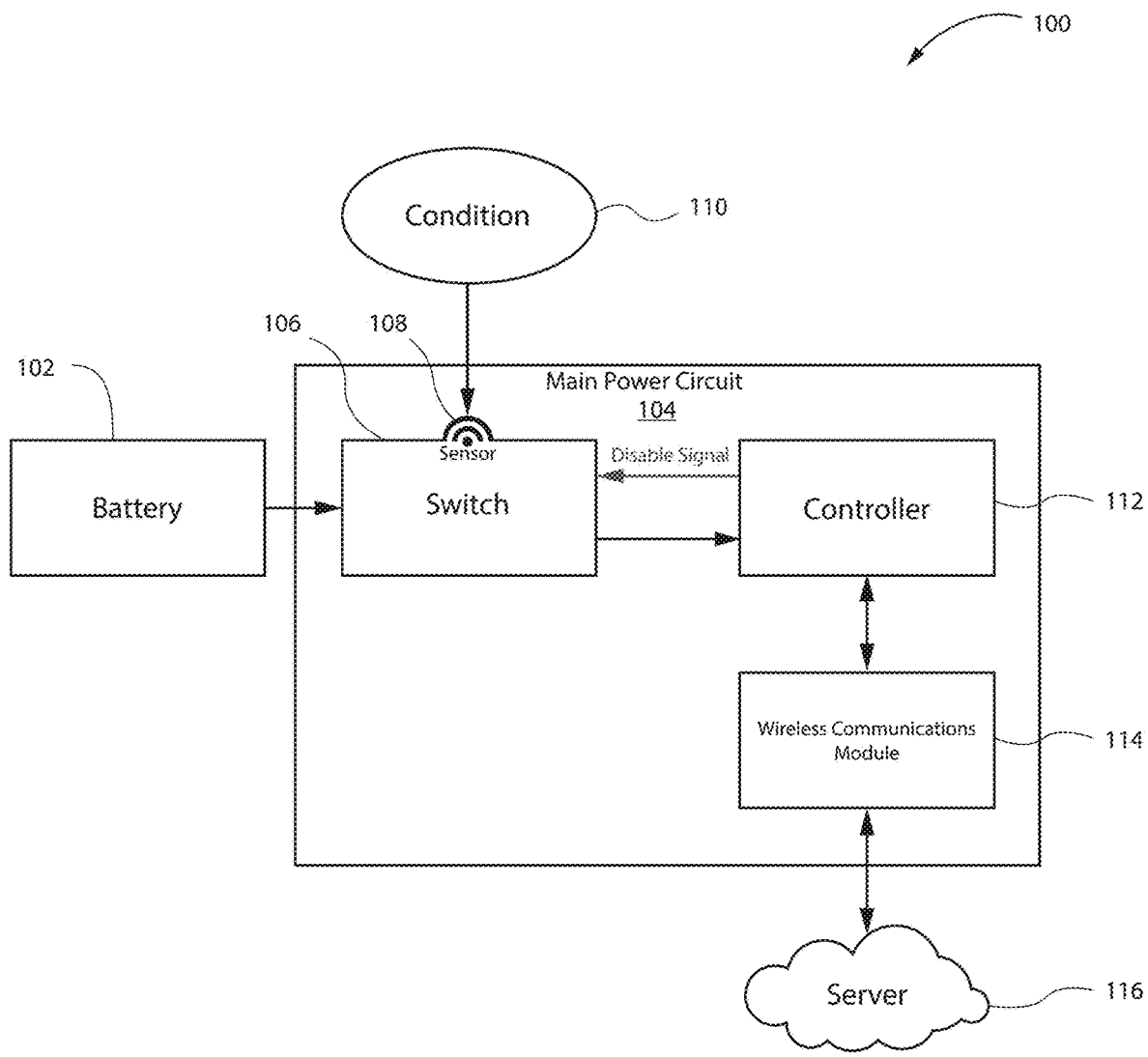
FIG. 1 is a simplified block diagram of an IoT device for enabling or disabling a power switch based on instructions from a remote server.

In one aspect, the present application describes an electronic device for controlling the powering of an Internet of Things device. The electronic device may include a battery to power the electronic device; a switch coupling the battery to a main power circuit for the electronic device, the switch including a sensor to detect a first condition, wherein the switch is open-circuited when the sensor detects the first condition and is otherwise close-circuited, connecting the battery to the main power circuit; a controller coupled to the switch; a wireless communications module coupled to the controller and configured to communicate with a remote server over a wireless channel and to receive configuration instructions from the remote server; and wherein, responsive to configuration instructions, the controller is configured to output a disable signal to the switch preventing the switch from open circuiting when the sensor detects the first condition.

In some implementations, the first condition may include presence of a magnetic field of greater than a threshold level.

In some implementations, the sensor may include a Hall effect sensor or a reed switch.

In some implementations, the device may further include a housing and a permanent magnet removably connected to the housing and proximate the sensor.

In some implementations, the device may further include a housing and a permanent magnet mounted to the housing and moveable between a first position proximate the sensor and a second position distant from the sensor.

In some implementations, the device may further include a physical switch having an on portion and an off portion, and wherein the first condition includes the physical switch being in the off position.

In some implementations, the controller may be configured to receive a signal from the sensor when the first condition is detected while the disable signal is output to the switch and, in response, to transmit a tamper alert to the remote server over the wireless channel.

In some implementations, the device may further include a location sensor coupled to the controller, and wherein the controller is configured to transmit location data from the sensor to the remote server.

In some implementations, the location sensor may further include a global navigation satellite system chip to receive satellite signals and determine the location data.

In some implementations, the switch may include a main switch to couple the battery to the main power circuit and a control switch connected to an input of the main switch to supply an active signal, the control switch receiving a sensor output signal from the sensor and the disable signal as inputs.

In yet another aspect, the present application describes a method of preventing the disabling of an electronic device, the electronic device including a battery to power the electronic device and a switch coupling the battery to a main power circuit for the electronic device, the switch including a sensor. The method may include detecting, by the sensor, a first condition and, in response, maintaining the switch open-circuit to decoupling the battery from the main power circuit; detecting, by the sensor, a second condition and, in response, close-circuiting the switch to couple the battery to the main power circuit to power a controller; wirelessly receiving, by the controller, configuration instructions from a remoter server via a wireless communications module; and responsive to the configuration instructions, sending a first disable signal from the controller to the switch to prevent the switch from open circuiting when the sensor detects the first condition.

In some implementations, detecting the first condition may further be based on identifying the presence of a magnetic field generator greater than a threshold level.

In some implementations, the first condition may be detected utilizing a Hall effect sensor or a reed switch.

In some implementations, detecting the first condition may further be based on detecting a permanent magnet proximate to the sensor and removably connected to a housing.

In some implementations, the electronic device may further include detecting a permanent magnet mounted to a housing and movable between a first position proximate the sensor and a second position distant from the sensor, and wherein detecting the first condition may include detecting the permanent magnet in the first position.

In some implementations, the device may include a physical switch having an on and off position, and detecting the first condition may include detecting the physical switch in the off position.

In some implementations, the method may further include transmitting a tamper alert to the remote server over the wireless channel in response to the controller receiving a signal from the sensor when the first condition is detected while the disable signal is output to the switch.

In some implementations, the method may further include determining, from a location sensor coupled to the controller, location data; and transmitting, by the controller via the wireless communications module, location data from the location sensor to the remote server.

In some implementations, determining location data may further include receiving, via a global navigation satellite system chip, satellite signals; and determining the location data.

In some implementations, the switch may include a main switch to couple the battery to the main power circuit and a control switch connected to an input of the main switch to supply an active signal, the control switch receiving a sensor output signal from the sensor and the disable signal as inputs.

Other example embodiments of the present disclosure will be apparent to those of ordinary skill in the art from a review of the following detailed description in conjunction with the drawings.

As noted above, Internet of Things (IoT) devices often make use of magnets, such as through Hall effect sensors, due in part to their low power draw as well as ease of use and installation. When used as a power switch, IoT devices are often kept in a powered off state in the presence of a magnet and enter a powered on state when the magnet is removed. As such, it may be as simple as removing a magnet to allow an IoT device to power on and connect to a remote server or another IoT device with minimal intervention or setup required by the user.

Those aware of the properties of a device making use of a magnetic power switch may utilize a magnet in order to disable such a device against the wishes of the installer. In fields such as asset tracking where a driver or other individual is involved in the transportation of assets, it is often the case that the individual would at times prefer not to be tracked, and would therefore opt to force the IoT tracking device into its powered off mode, against the wishes of the entity performing the tracking. Beyond these drivers, other individuals with the knowledge of IoT devices may wish to take advantage of this weakness to relocate or even steal assets that could otherwise be recovered through tracking.

In accordance with one aspect of the present application, an IoT device is described that makes use of magnets and magnetic sensors for controlling power on and power off states and which is configured to disable or enable these sensors based on an instruction from a remote server. After the IoT device is initially powered on through removal or movement of a magnet, the device contacts the remote server to register its initiation. The remote server may then send an instruction to the IoT device that configures the IoT device to disable a switch controlled by the magnetic sensor, so as to prevent the switch from open-circuiting if a magnet is brought into close proximity of the magnetic sensor.

Reference is now made to FIG. 1, which shows in block diagram form a simplified example of an IoT device 100 in accordance with the present application. The device 100 includes at least one battery 102. The battery 102 may power at least the main power circuit 104 to which it is coupled. The battery 102 may include an integrated battery, a removable or replaceable battery, a rechargeable battery, or two or more such batteries. The device 100 may further include battery charging circuitry (not shown) to receive charge from an external power source.

The main power circuit 104 contains at least a switch 106, a controller 112, and a communications module 114. The main power circuit 104 is coupled to at least the battery 102 by way of the switch 106. Power is delivered from the battery 102 to the main power circuit 104 and, while the switch 106 is close-circuited, to at least the controller 112 and the communications module 114.

The switch 106 couples the battery 102 to the main power circuit 104. When it is close-circuited, allowing power to pass from the battery 102 through the main power circuit 104 to at least the controller 112 and the wireless communications module. When the switch 106 is open-circuited it prevents power from passing through the main power circuit 104 to the controller.

The switch 106 includes a sensor 108. The sensor 108 detects the presence of the first condition 110. When the first condition 110 is detected by the sensor 108, the switch 106 is in an open-circuited state, and it is otherwise close-circuited in the absence of the first condition 110.

The first condition 110 may include the presence of a magnetic field of greater than a threshold level. In this case, the sensor 108 may be a Hall effect sensor, or an alternative that may detect the presence of a magnetic field greater than a threshold level, and the switch 106 will open-circuit in the presence of a magnetic field and close-circuit in its absence. Alternatively, the switch 106 may comprise a physical switch having an on position and an off position, wherein the first condition 110 may include the physical switch being in the on position, as detected by sensor 108. These embodiments are listed by way of example, and should not be taken to be a comprehensive list of potential condition and sensor pairings.

The controller 112 may, in some embodiments, be a microprocessor that may be coupled to some memory (not pictured). The memory may store instructions that, when executed, configure the processor to carry out operations, such as implementing further configuration instructions from the wireless communications module 114.

The wireless communications module 114 communicates with the remote server 116 at least to receive configuration instructions. The wireless communications module 114 may communicate directly with the remote server 116 by way of the internet such as through a cellular or local area network or may connect through another IoT device or receiver. The wireless communications module 114 may transmit data to the remote server 116 as well as receive data from it. The wireless communication module 114 may also communicate received data such as configuration instructions with at least the controller 112.

The remote server 116 may contain configuration instructions for at least the IoT device 100. The remote server 116 may contain configuration instructions for a plurality of similar devices and may associate one or more devices with a user profile which, in some embodiments, a user may be able to access in order to update the configuration instructions associated with the IoT device 100. In some embodiments, the remote server 116 may be hosted or operated by a third party.

The remote server 116 may retrieve and transmit configuration instructions to the IoT device 100 via the wireless communications module 114. The IoT device 100 may, in response to receipt of the configuration instructions, disable the mechanism for disconnecting power from the battery 102. In particular, in this example, the controller 112 may be configured to output a disable signal to the switch 106. In some embodiments, the switch 106 may receive a disable signal from the controller 112, which causes or configures the switch 106 to remain closed, connecting the battery 102 to the main power circuit 104, whether the first condition 110 is detected or not.

In some cases, the configuration instructions may configure the controller to either output the disable signal or to cease outputting the disable signal to the switch 106. For example, when the IoT device 100 is first powered on, based on the switch 106 closing in response to the sensor 108 ceasing to detect the first condition 110, the controller 112 may contact the remote server 116 any may receive instructions to disable operation of the sensor 108 such that the switch 106 remains closed irrespective of whether the first condition 110 is detected by the sensor 108. The controller 112 outputs the disable signal to disable operation of the sensor 108 or prevent open-circuiting of the switch 106. However, in some cases, an administrator or other authorized user may wish to disable the IoT device 100 and may, via an administrator interface or input, cause the remote server 116 to send new configuration instructions to the controller 112 causing the controller 112 to cease outputting the disable signal. The IoT device 100 is then in a state in which detection of the first condition 110 will cause open-circuiting of the switch 106, disconnecting the battery 102 from the main power circuit 104 and powering off of the device 100.

Figure 2:
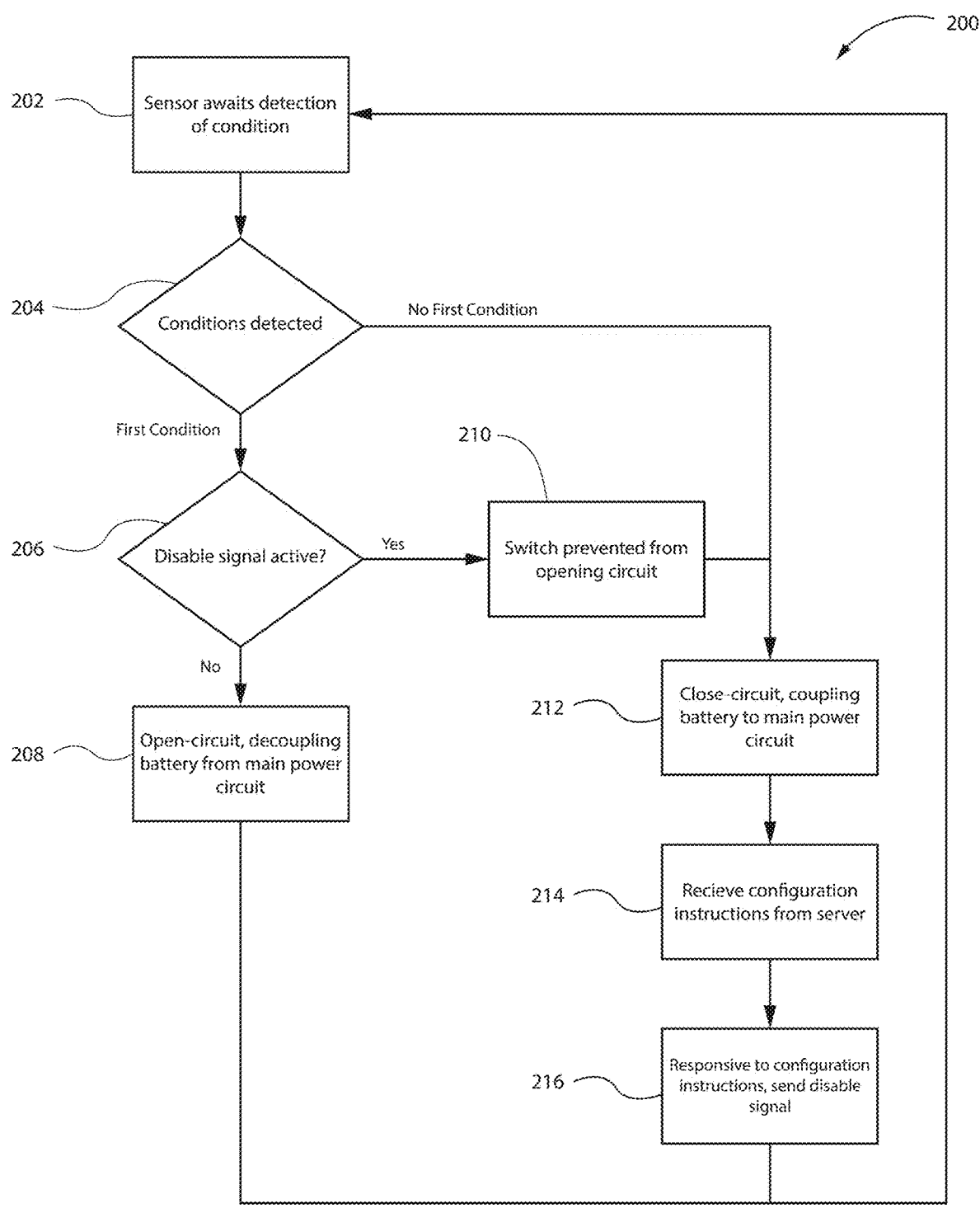
FIG. 2 is a flowchart showing one simplified example method of detecting the presence of a condition and open-circuiting or close-circuiting based on configuration instructions received from a remote server.

Reference is now made to FIG. 2, showing one simplified example method 200 of detecting the presence of a condition and open-circuiting or close-circuiting based on configuration instructions received from a remote server. The method 200 may be implemented by way of the IoT device 100 (FIG. 1).

In operation 202, the IoT device awaits the detection of a condition. The IoT device may be open-circuited or close-circuited while awaiting the detection of a condition, and may be in a low power consumption state.

In operation 204, the IoT device detects the presence of a condition by way of the sensor included with the switch. The condition may be the presence or absence of a magnetic field. In such implementations, the first condition may be detection of a magnetic field above a threshold magnetic field level.

If the first condition was detected in operation 204, e.g. a magnetic field above a certain threshold is identified, then in operation 206, the IoT device determines whether the switch is receiving the disable signal from the controller is active.

If the disable signal from the controller is not active, such that the switch operates remotely, then in operation 208 the switch open-circuits due to the detected first condition, decoupling the battery from the main power circuit. Once open-circuited, the IoT device returns to monitor the condition as in operation 202. If the switch was already open-circuited, the switch may remain open-circuited.

If the disable signal from the controller is active in operation 206, then in operation 210 the switch is prevented from open-circuiting despite detection of the first condition.

If the first condition was not detected in operation 204, e.g. a magnetic field above a circuit threshold was not identified, or if the switch was prevented from open-circuiting in operation 210, then in operation 212, the switch close-circuits, coupling power to the main circuit. If the switch was already close circuited, then the circuit may remain closed.

In operation 214, the IoT device receives configuration instructions from a remote server. Communication with the server may be may be through a cellular network, Wi-Fi, networking with other IoT devices, or through some other means of wireless communication.

In operation 216, responsive to the configuration instructions received in operation 214, the controller may send a disable signal to the switch. While active, the disable signal may prevent the switch 106 from open-circuiting despite the detection of the first condition. Whether the disable signal is or is not sent to the switch, the sensor returns to awaiting the detection of conditions as in operation 202.

Figure 3:
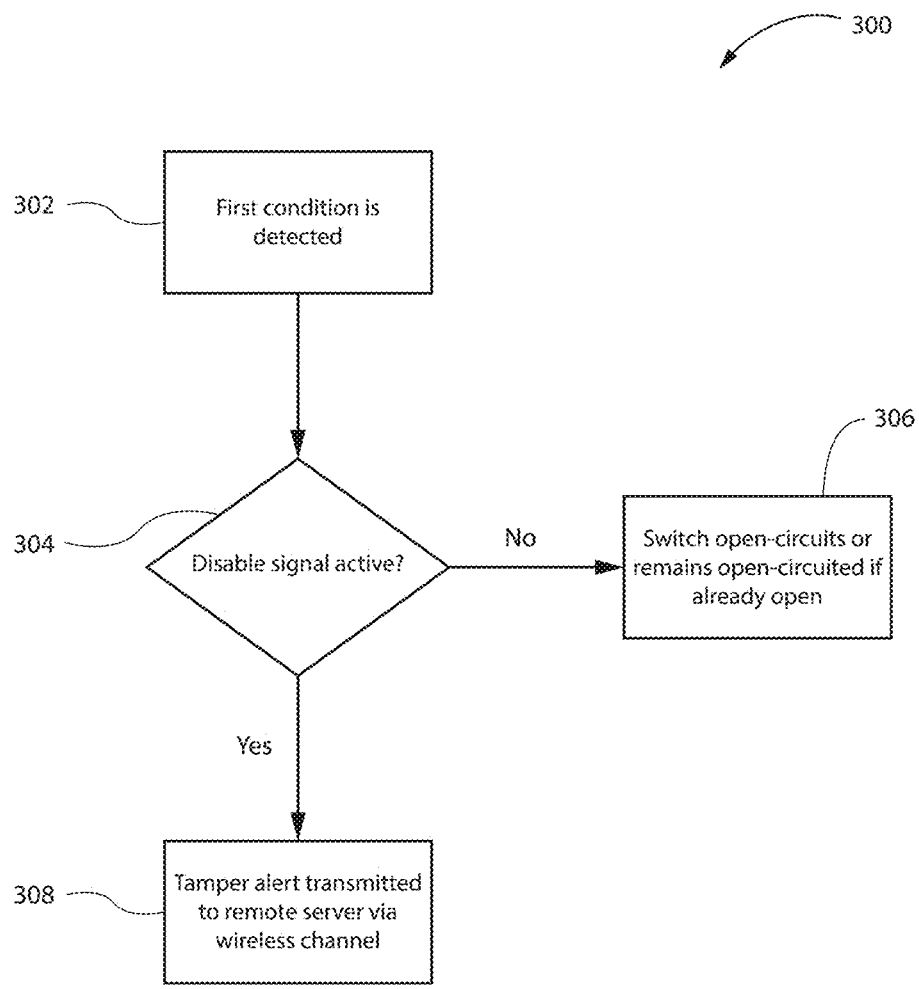
FIG. 3 is a flowchart showing one simplified example method of transmitting a tamper alert when a first condition is detected and the disable signal is active.

Reference is now made to FIG. 3 showing one simplified example method 300 of transmitting a tamper alert when a first condition is detected and the disable signal is active. The method 300 may be implemented by way of IoT device 100 (FIG. 1). In operation 302, the sensor detects the first condition, e.g. a magnetic field above a certain threshold. In operation 304, it determines whether the disable signal from the controller is active. If the disable signal is not detected in operation 304, in operation 306 the switch open-circuits or remains open-circuited if was previously open-circuited. If the disable signal is active then, in operation 308, a tamper alert is transmitted to a remote server via a wireless channel. The tamper alert may be used to identify attempted tampering with the IoT device, e.g. where the IoT device is incorporated into a tracking device, a driver attempting to disable the device to prevent being tracked. The remote server may save information such as the time, date, and location of where the alert was triggered, which may be accessed by or transmitted to one or a plurality of users. The remote server may generate and send a notification to a user or administrator associated with the IoT device in some cases.

Figure 4:
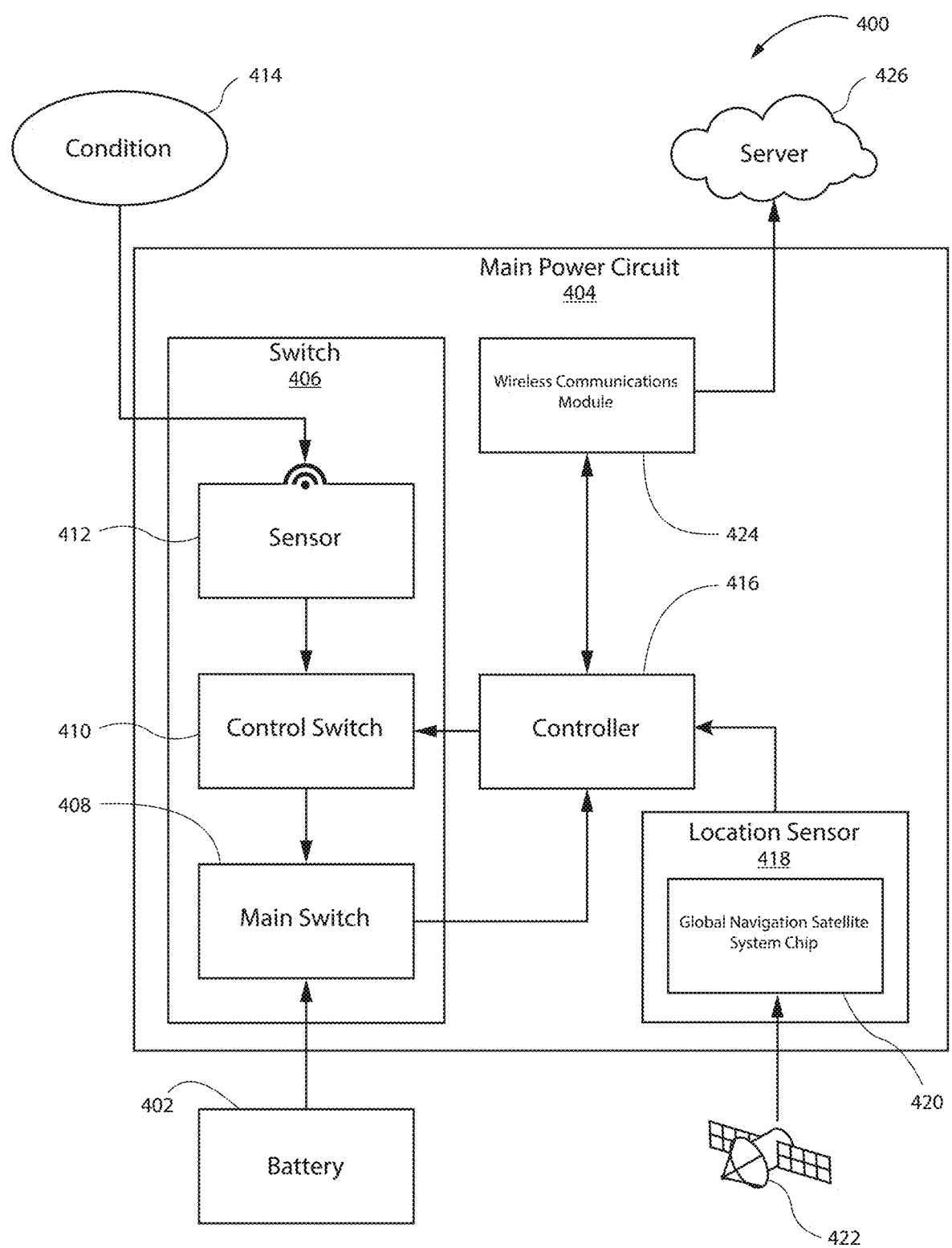
FIG. 4 is a simplified block diagram of the IoT device implemented into a tracking device featuring a global navigation satellite system chip.

Reference is now made to FIG. 4 showing the IoT device implemented into a tracking device 400 which may feature a global navigation satellite system chip 420. The tracking device 400 includes a battery 402 coupled to the main power circuit 404 via the switch 406.

In some embodiments, the switch 406 may include a main switch 408 to couple the battery 402 to the main power circuit 404 and a control switch 410 connected to the input of the main switch 408 to supply an activate signal, the control switch 410 receiving a sensor output signal from the sensor 412 and a disable signal from the controller 416 as inputs. When the sensor 412 detects the presence of first condition 414, the sensor may output a signal to control switch 410. If the control switch 410 receives this output signal while not receiving the disable signal from controller 416, the control switch 410 will supply the active signal to the main switch 408, causing main switch 408 to open circuit, effectively decoupling battery 402 from the main power circuit 404. In some implementations, the control switch 410 may be implemented using a field effect transistor. The control switch 410 may be configured using a P-FET in some cases or an N-FET in some other cases. Alternative circuit elements may also be used in some implementations.

In another embodiment, the main switch 408 may be implemented using a switch mode power supply or Low Dropout (LDO) regulator used to regulate power from battery 402 to the main power circuit 404. An enable input pin on the power supply or LDO, controlled by the output from control switch 410, may be used to "switch" power to the system.

The location sensor 418 functions to gather location data on tracking device 400. Location data gathered in this way are transferred to the controller 416, which is configured to transmit the location data via the wireless communications module 424 to the remote server 426. The location data may include at least the location of tracking device 400 in addition to a timestamp indicating when tracking device 400 was at that location. In some embodiments, location sensor 418 may include the global navigation satellite system chip 420, which may facilitate the determination of location data by receiving signals from a plurality of satellites. In other embodiments, the location sensor 418 may include additional or alternative methods for gathering location data, e.g. cellular networks, Wi-Fi.

The remote server 426 may store location data received from tracking device 400. In some embodiments, the location data may be accessible to users alongside the previously described configuration instructions as well as any tamper alerts that may be received such as through the operations detailed in FIG. 3.

Figure 5:
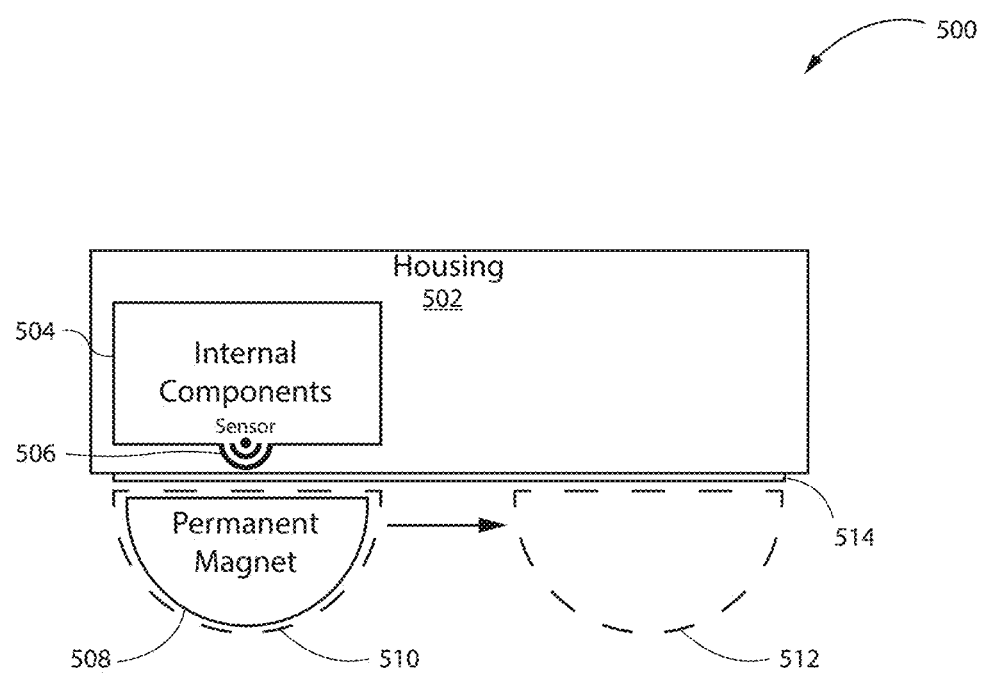
FIG. 5 is a simplified block diagram of the IoT device further comprising a housing and permanent magnet mounted to the housing, movable between two positions.

Reference is now made to FIG. 5 showing a simplified block diagram of an IoT device 500 detailed in this application further comprising a housing 502 and permanent magnet 508 mounted to the housing 502, movable between two positions. Housing 502 may be comprised of metal, plastic, or any other material through which magnetic fields may pass, and may protect internal components 504 from damage or tampering.

Internal components 504 may be coupled to housing 502 and may include the devices detailed in FIG. 1 and FIG. 4 in some implementations. Internal components 504 include at least a sensor 506 which may detect a magnetic field of above a certain threshold, such as a Hall sensor.

Permanent magnet 508 provides a magnetic field of above a certain threshold detectable by the sensor 506. In some embodiments, the permanent magnet 508 may be removably connected to housing 502 proximate the sensor 506. While proximate permanent magnet 508, sensor 506 may output a signal to a switch, open-circuiting internal components 504 as described previously in this application.

In other embodiments, the permanent magnet 508 may be mounted to the housing 502 and movable between a first position 510, proximate the sensor 506, and a second position 512, not proximate the sensor 506. The permanent magnet 508 may be mounted to the housing 502 via a rail 514 or some other system facilitating the movement of the permanent magnet 508 between the first position 510 and the second position 512.

Figure 6:
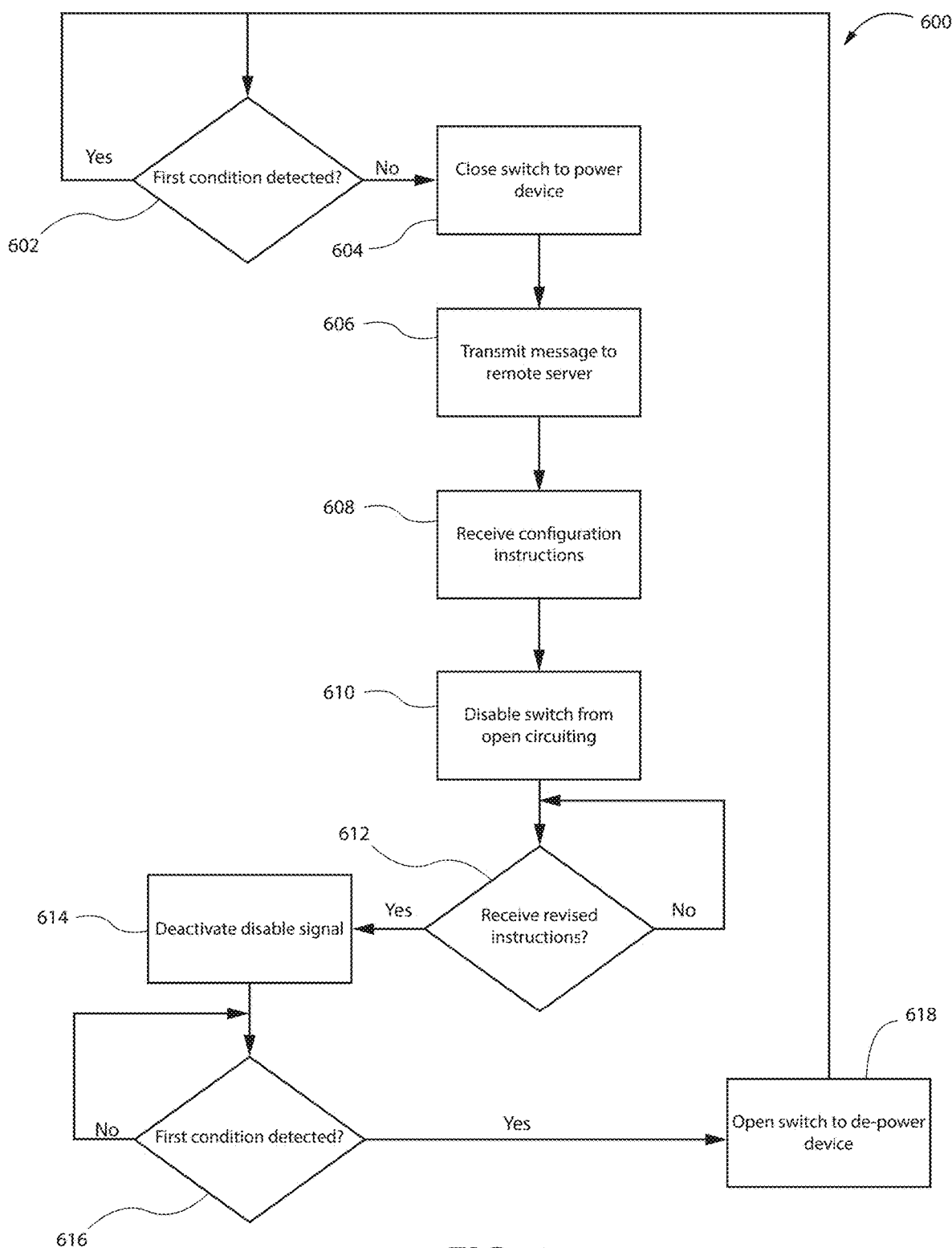
FIG. 6 is a flow chart of a method according to one embodiment of the present disclosure.

Reference is now made to FIG. 6 showing one simplified example method 600 of, upon detecting the absence of a first condition, close-circuiting an IoT device, transmitting a message to a remote server, and receiving and executing configuration instructions from the remote server. When a first condition is not detected by a sensor coupled to a switch in operation 602, the switch is close-circuited, powering the IoT device in operation 604.

In operation 606, a message is transmitted from the IoT device to the remote server. The message may be transmitted via a wireless communications module, and may contain at least some identification data that may be used by the remote server to identify the IoT device. The message may further contain location data for the IoT device. In some embodiments, the message may request configuration instructions from the remote server.

In operation 608, configuration instructions are received from the remote server. In some embodiments, the configuration instructions may be received in response to the message transmitted in operation 606. The configuration instructions may have been created or modified by a user or administrator with access to the remote server.

In operation 610, in accordance with the configuration instructions, the IoT device may disable the switch from open circuiting, despite the detection of the first condition.

In operation 612, the IoT device remains close-circuited until revised configuration instructions are received from the remote server, configuring the IoT device to deactivate the disable signal in operation 614.

In operation 616, the IoT device monitors for detection of the first condition. If the first condition is detected, in operation 618, then in response to the detected first condition the switch open-circuits, de-powering the IoT device, at which point the IoT device resumes monitoring the presence of the first condition, per operation 602.

The above discussed embodiments are considered to be illustrative and not restrictive. Certain adaptations and modifications of the described embodiments may be made. All such modification, permutations and combinations are intended to fall within the scope of the present disclosure.

The invention claimed is:

1. An electronic device, comprising:
a housing;
a permanent magnet removably connected to the housing;
a battery configured to power the electronic device;
a switch comprising a magnetic sensor configured to detect a first condition, wherein the switch is configured to be open-circuited when the magnetic sensor detects the first condition and the switch is not disabled, wherein when the switch is close-circuited the battery is connected to a main power circuit, wherein the first condition comprises presence of a magnetic field at the magnetic sensor of greater than a threshold level, and wherein the magnetic sensor is disposed inside the housing; and
a controller configured to:
transmit a request for configuration instructions to a remote server, in response to the magnetic sensor ceasing to detect the first condition;
receive the configuration instructions from the remote server; and
disable the switch, based on the received configuration instructions, such that the switch remains closed irrespective of whether the first condition is detected by the magnetic sensor.

2. The electronic device of claim 1, wherein the magnetic sensor comprises a Hall effect sensor or a reed switch.

3. The electronic device of claim 1, wherein the permanent magnet is moveable between a first position proximate the magnetic sensor and a second position distant from the magnetic sensor.

4. The electronic device of claim 1, wherein the switch comprises a physical switch having an on position and an off position, and wherein the first condition comprises the physical switch being in the off position.

5. The electronic device of claim 1, wherein the controller is further configured to receive a signal from the magnetic sensor when the first condition is detected while a disable signal is output to the switch and, in response, to transmit a tamper alert to the remote server over a wireless channel.

6. The electronic device of claim 1, further comprising a location sensor coupled to the controller, wherein the controller is further configured to transmit location data from the location sensor to the remote server.

7. The electronic device of claim 6, wherein the location sensor comprises a global navigation satellite system chip configured to receive satellite signals and determine the location data.

8. The electronic device of claim 1, wherein the switch comprises a main switch configured to couple the battery to the main power circuit, and a control switch connected to an input of the main switch to supply an activate signal, and wherein the control switch is configured to receive a sensor output signal from the magnetic sensor and a disable signal as inputs.

9. A method for preventing disabling of an electronic device, the method comprising:
  detecting, by a magnetic sensor of a switch of the electronic device, a first condition, wherein the first condition comprises presence of a magnetic field at the magnetic sensor of greater than a threshold level, wherein the switch is configured to be open-circuited when the magnetic sensor detects the first condition and the switch is not disabled, and wherein when the switch is close-circuited a battery of the electronic device is connected to a main power circuit;
  transmitting, by a controller, a request for configuration instructions to a remote server, in response to the magnetic sensor ceasing to detect the first condition;
  receiving, by the controller, the configuration instructions from the remote server; and
  disabling, by the controller, the switch, based on the received configuration instructions, such that the switch remains closed irrespective of whether the first condition is detected by the magnetic sensor.

10. The method of claim 9, wherein the first condition is sensor comprises a Hall effect sensor or a reed switch.

11. The method of claim 9, wherein a permanent magnet is movable between a first position proximate the magnetic sensor and a second position distant from the magnetic sensor, and wherein the detecting of the first condition comprises detecting that the permanent magnet is in the first position.

12. The method of claim 9, wherein the switch comprises a physical switch having an on position and an off position, and wherein the detecting of the first condition comprises detecting that the physical switch is in the off position.

13. The method of claim 9, further comprising transmitting a tamper alert to the remote server over a wireless channel in response to the controller receiving a signal from the magnetic sensor when the first condition is detected while a disable signal is output to the switch.

14. The method of claim 9, further comprising:
  determining, from a location sensor coupled to the controller, location data; and
  transmitting, by the controller via a wireless communications module, the location data to the remote server.

15. The method of claim 14, wherein the determining of the location data comprises receiving, via a global navigation satellite system chip, satellite signals.

16. The method of claim 9, wherein the switch comprises a main switch configured to couple the battery to the main power circuit, and a control switch connected to an input of the main switch and configured to supply an activate signal, and receive a sensor output signal from the magnetic sensor and a disable signal as inputs.

* * * * *